US012637597B2

(12) United States Patent
Dehnicke et al.

(10) Patent No.: US 12,637,597 B2
(45) Date of Patent: May 26, 2026

(54) ADVANCED BONDING AGENT

(71) Applicant: DDP SPECIALTY ELECTRONIC MATERIALS US, LLC, Wilmington, DE (US)

(72) Inventors: Stefan Dehnicke, Frankfurt (DE); Kai Ziegler, Frankfurt (DE); Philipp Zutavern, Frankfurt (DE); Anna Osichow, Eppstein (DE); Gerd Becker, Schwalbach (DE)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 327 days.

(21) Appl. No.: 18/260,189

(22) PCT Filed: Feb. 16, 2022

(86) PCT No.: PCT/US2022/016507

§ 371 (c)(1),
(2) Date: Jun. 30, 2023

(87) PCT Pub. No.: WO2022/191964

PCT Pub. Date: Sep. 15, 2022

(65) Prior Publication Data

US 2024/0076533 A1 Mar. 7, 2024

Related U.S. Application Data

(60) Provisional application No. 63/158,427, filed on Mar. 9, 2021.

(51) Int. Cl.

| | |
|---|---|
| ***C09J 129/14*** | (2006.01) |
| ***B32B 7/12*** | (2006.01) |
| ***B32B 15/088*** | (2006.01) |
| ***B32B 15/095*** | (2006.01) |
| ***B32B 15/18*** | (2006.01) |
| ***B32B 27/08*** | (2006.01) |
| ***B32B 27/34*** | (2006.01) |
| ***B32B 27/40*** | (2006.01) |
| ***B32B 37/12*** | (2006.01) |
| ***C08J 5/12*** | (2006.01) |
| ***C09J 5/06*** | (2006.01) |
| ***C09J 161/06*** | (2006.01) |

(52) U.S. Cl.

CPC ............... *C09J 161/06* (2013.01); *B32B 7/12* (2013.01); *B32B 15/088* (2013.01); *B32B 15/095* (2013.01); *B32B 15/18* (2013.01); *B32B 27/08* (2013.01); *B32B 27/34* (2013.01); *B32B 27/40* (2013.01); *B32B 37/1207* (2013.01); *C08J 5/125* (2013.01); *C09J 5/06* (2013.01); *C09J 129/14* (2013.01); *B32B 2250/02* (2013.01); *B32B 2255/06* (2013.01); *B32B 2255/26* (2013.01); *B32B 2307/748* (2013.01); *B32B 2311/30* (2013.01); *B32B 2375/00* (2013.01); *B32B 2377/00* (2013.01); *C08J 2375/04* (2013.01); *C08J 2429/14* (2013.01); *C08J 2461/10* (2013.01); *C09J 2400/166* (2013.01); *C09J 2429/00* (2013.01); *C09J 2461/00* (2013.01); *C09J 2475/008* (2013.01)

(58) Field of Classification Search

CPC ......... B32B 7/12; B32B 15/088; B32B 15/09; B32B 15/095; B32B 27/34; B32B 27/36; B32B 27/40; B32B 37/1207; B32B 2255/06; B32B 2311/00; B32B 2367/00; B32B 2375/00; B32B 2377/00; C08J 5/121; C08J 5/125; C08J 2429/04; C08J 2429/14; C08J 2431/04; C08J 2461/10; C08L 29/14; C08L 61/06; C09J 5/06; C09J 129/04; C09J 129/14; C09J 131/04; C09J 161/06; C09J 2400/16; C09J 2400/163; C09J 2400/166; C09J 2429/00; C09J 2429/003; C09J 2431/00; C09J 2431/003; C09J 2459/00; C09J 2459/003; C09J 2461/00; C09J 2461/003; C09J 2467/00; C09J 2467/006; C09J 2467/008; C09J 2475/00; C09J 2475/006; C09J 2475/008; C09J 2477/00; C09J 2477/006; C09J 2477/008

See application file for complete search history.

(56) References Cited

U.S. PATENT DOCUMENTS

| | | | | |
|---|---|---|---|---|
| 2,966,475 A * | 12/1960 | Van Putten | C09J 129/14 525/61 |
| 3,308,008 A * | 3/1967 | Ronay | C09J 161/06 428/447 |
| 4,264,671 A * | 4/1981 | Gillern | C08J 5/244 156/335 |
| 4,341,831 A | 7/1982 | Kleiss | |
| 2016/0289367 A1 | 10/2016 | Mifuka et al. | |
| 2017/0355871 A1* | 12/2017 | Song | C09D 161/28 |

FOREIGN PATENT DOCUMENTS

SU 882757 A1 11/1981

OTHER PUBLICATIONS

Eastman: "Butvar Polyvinyl Resins: properties and uses", Internet Citation Jan. 1, 2017, URL: https://www.eastman.com/Literature_Canter/A/ADDBVR3978.PDF [retrieved on Nov. 2, 2018] entire p. 2.

SU882757A1 Abstract.

* cited by examiner

*Primary Examiner* — Michael A Tolin

(57) ABSTRACT

The invention provides a bonding agent particularly suited for bonding metal to castable polyurethane, polyesters and or polyamides.

16 Claims, No Drawings

ADVANCED BONDING AGENT

CROSS REFERENCE TO RELATED APPLICATIONS

This application is a U.S. national stage filing under 35 U.S.C. § 371 of PCT Application No. PCT/US22/016507, filed 16 Feb. 2022, currently pending, which claims the benefit of U.S. Patent Application No. 63/158,427, filed 9 Mar. 2021, under 35 U.S.C. § 119 (e). PCT Application No. PCT/US22/016507, and U.S. Patent Application No. 63/158,427 are hereby incorporated by reference.

FIELD OF INVENTION

The present invention relates to the field of one-component adhesives, particularly for adhesion of polyurethane, polyesters and/or nylon to metal.

BACKGROUND OF THE INVENTION

Cast polyurethanes are cost effective and dependable elastomers that combine some of the performance advantages of engineering plastics, metals and ceramics along with the resiliency and flexibility of rubber. Cast Polyurethanes are well known for their high load bearing capacity, high impact strength, high abrasion resistance, high resilience and excellent resistance to oil and grease. Polyurethanes are often chosen where resistance to the actions of sliding, stretching, load-bearing, impacting, cutting and tearing, compression, torsional forces, ageing and oil-resistance are involved.

Bonding of castable polyurethane elastomers to a substrate like metal or plastic is demanding for the bonding agents. The bonding agent should demonstrate similar properties as the polyurethane, in particular good resistance properties. A major challenge for cast polyurethane/substrate parts and their bonding line is high temperature resistance.

Lightweight design is one of the key technologies when it comes to reducing the energy consumption of vehicles. Replacing traditional materials with plastic polymers has now become the norm in many sectors. Automotive, aerospace, industrial and domestic machinery have been benefiting from the advantages of lighter, better performing components, manufactured using efficient and economical processes. Metal replacement is often a key to reduce weight, cost and production times. Substrates like metal or plastic polymers are physically hard, showing a high tensile strength combined with relatively low values for strain at break.

The inherent corrosion resistance of polyamides is a strong driver to replace metal by glass fiber reinforced polyamides. A hybrid system of metal and plastic is desired for flexible part design with parallel increased performance. This requires suitable bonding agent solutions.

There is an ongoing need for adhesives capable of bonding cast polyurethane elastomer to substrates as well as reinforced plastic (for example, polyesters and polyamides) to metal. In particular, there is a need for such adhesives that have good high-temperature resistance.

SUMMARY OF THE INVENTION

In a first aspect, the invention provides a bonding agent comprising:

(1) a phenolic resol resin;

(2) polyvinylbutyral;

(3) a solvent or solvent mixture that is capable of solvating ingredients (1) and (2), while being sufficiently volatile to be removed at atmospheric pressure.

In a second aspect, the invention provides a method for adhering a first substrate that is made of material selected from polyurethane, polyester polyamide and metal to a second substrate that is made of material selected from polyurethane, polyester, polyamide and metal, the method comprising the steps:

(1) providing an assembly that comprises a first substrate that is substantially made of material selected from polyurethane, polyester, polyamide and metal and a second substrate that is substantially made of material selected from polyurethane, polyester, polyamide and metal, wherein the first substrate and the second substrate have sandwiched between them a layer of bonding agent comprising a (i) phenolic resol resin, (ii) polyvinylbutyral and a solvent or solvent mixture that is capable of solvating ingredients (i) and (ii), while being sufficiently volatile to be removed at atmospheric pressure; and (2) heating the assembly to 90-200° C. for a time sufficient to form an adhesive bond between the first and second substrates, wherein the first and second substrates are not both metal.

In a third aspect, the invention provides a method for adhering a first substrate that is substantially made of material selected from polyurethane, polyester, polyamide and metal to a second substrate that is substantially made of material selected from polyurethane, polyester, polyamide and metal, the method comprising the steps:

(1) providing the first substrate;

(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, while being sufficiently volatile to be removed at atmospheric pressure;

(3) optionally removing the solvent or solvent mixture by evaporation;

(4) placing the bonding agent layer in contact with a second substrate that is made of material selected from polyurethane, polyester, polyamide and metal, to form an assembly;

(5) heating the assembly to 90-200° C. for a time sufficient to form an adhesive bond between the first and second substrates, wherein the first and second substrates are not both metal.

In a fourth aspect, the invention provides a metal substrate coated with a bonding agent, where in the bonding agent comprises:

(1) a phenolic resol resin;

(2) polyvinylbutyral;

(3) a solvent or solvent mixture that is capable of solvating ingredients (1) and (2), while being sufficiently volatile to be removed at atmospheric pressure.

In a fifth aspect, the invention provides a method for adhering a first substrate that is substantially made of metal to a second substrate that is substantially made of material selected from polyurethane, polyester, polyamide and metal, the method comprising the steps:

(1) providing a first substrate that is metal coated on a surface with a bonding agent comprising a (i) phenolic resol resin, (ii) polyvinylbutyral, a solvent or solvent mixture that is capable of solvating ingredients (i) and (ii), while being sufficiently volatile to be removed at atmospheric pressure;

(2) placing the coated surface of the first substrate in contact with a second substrate that is selected from castable polyurethane and polyamide;
(3) heating the assembly to 90-200° C. for a time sufficient to form an adhesive bond between the first and second substrates.

In a sixth aspect, the invention provides a method for adhering a first substrate that is substantially made of material selected from metal to a second substrate that is substantially made of material selected from polyamide, the method comprising the steps:
(1) providing the first metal substrate;
(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, while being sufficiently volatile to be removed at atmospheric pressure;
(3) optionally removing the solvent or solvent mixture by evaporation;
(4) applying molten molten polyamide to the bonding agent, such that the heat of the molten polyamide cures the bonding agent.

DETAILED DESCRIPTION OF THE INVENTION

The inventors have surprisingly found that a bonding agent comprising:
(1) a phenolic resol resin;
(2) polyvinylbutyral;
(3) a solvent or solvent mixture that is capable of solvating ingredients (1) and (2), while being sufficiently volatile to be removed at atmospheric pressure, provides excellent bonding between the following substrate pairs:

| Substrate 1 | Substrate 2 |
|---|---|
| Metal (e.g. aluminium, steel) | Castable polyurethane |
| Metal (e.g. aluminium, steel) | Polyamide |
| Metal (e.g. aluminium, steel) | Polyester |
| Castable polyurethane | Castable polyurethane |
| Castable polyurethane | Polyamide |
| Castable polyurethane | Polyester |
| Polyamide | Polyamide |
| Polyamide | Polyester |
| Polyester | Castable polyurethane |
| Polyester | Polyester |

Definitions and Abbreviations

PU polyurethane
TDI toluene diisocyanate
SEC size exclusion chromatography

Molecular weights of polymers as reported herein are reported in Daltons (Da) as number or weight average molecular weights, as determined by size exclusion chromatography (SEC).

Phenolic Resol Resin

The bonding agent of the invention comprises a phenolic resol resin, by which is meant polymers made by reacting formaldehyde with phenol using a basic catalyst so that the polymer contains pendant methylol groups.

In a particularly preferred embodiment, the phenolic resol resin has the following characteristics:
Viscosity at 20° C., according to DIN EN ISO 12058-1, of 4000±500 mPa·s
Non-volatile components at 135° C., according to DIN 16916-02-H1, ISO 8618 of 79±2%
Content of free formaldehyde, according to DIN 16916-02, DIN EN ISO 11402 of maximum 5%
Specific gravity at 20° C. of 1.26 g/cm$^3$.

The bonding agent of the invention preferably contains phenolic resol resin at 5 to 20 wt %, more preferably at 7 to 15 wt %, more particularly preferably 8 to 13 wt %, even more particularly preferably at 11-12 wt %.

In a particularly preferred embodiment, the phenolic resol resin is used at 8 to 13 wt %, more particularly preferably at 11-12 wt %, and has the following characteristics:
Viscosity at 20° C., according to DIN EN ISO 12058-1, of 4000±500 mPa·s,
Non-volatile components at 135° C., according to DIN 16916-02-H1, ISO 8618 of 79±2%,
Content of free formaldehyde, according to DIN 16916-02, DIN EN ISO 11402 of maximum 5%,
Specific gravity at 20° C. of 1.26 g/cm$^3$.

Polyvinylbutyral

The bonding agent of the invention comprises polyvinylbutyral (PVB). In a preferred embodiment, the PVB has the following structure:

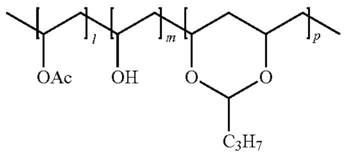

where the polyvinyl acetate (l) content is 1-8 wt %, the polyvinyl alcohol (m) content is 11-27 wt % and the acetal (p) content is 65-88 wt %.

Particularly preferably, the acetal has the following structure:

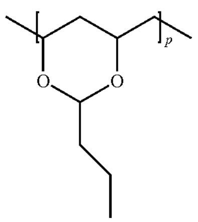

Preferably the content of polyvinyl alcohol is 11-16 wt %. Preferably the polyvinyl acetate content is 1-6 wt %. Preferably the acetal content is 82-88 wt %. In a particularly preferred embodiment, the polyvinyl alcohol is 11-16 wt %, the polyvinyl acetate content is 1-6 wt %, and the acetal content is 82-88 wt %. These weight percentages are based on the total weight of the PVB.

More preferably the content of polyvinyl alcohol is 12-16 wt %. Preferably the polyvinyl acetate content is 1-4 wt %. Preferably the acetal content is 82-88 wt %. In a particularly preferred embodiment, the polyvinyl alcohol is 12-16 wt %, the polyvinyl acetate content is 1-4 wt %, and the acetal content is 82-88 wt %. These weight percentages are based on the total weight of the PVB.

In a particularly preferred embodiment, the polyvinylbutyral has a non-volatile content (determined according to DIN 53216) of greater than or equal to 97.5 wt %, a polyvinyl alcohol content of 12-16 wt % and a polyvinyl acetate content of 1-4 wt %, an acetal content of 82-88 wt %, a dynamic viscosity as determined according to DIN 53015 in a 10% ethanol solution at 20° C. of 120-280, a glass transition temperature, determined by DSC, according to ISO 11357-1, of 65° C., a water up-take after 24 hours water immersion at 20° C. of 3-5 wt %, and a bulk density, determined according to DIN EN 543, of 210 g/l. Weight percentages are based on the total weight of the PVB.

The bonding agent of the invention preferably contains PVB at 5 to 15 wt %, more preferably 8 to 12 wt %, more particularly preferably at 10-11 wt %, based on the total weight of the bonding agent.

In a particularly preferred embodiment, the PVB is present at 8 to 12 wt %, based on the total weight of the bonding agent, and the PVB has the following structure:

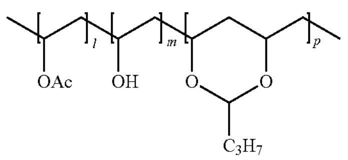

where the polyvinyl acetate (l) content is 1-8 wt %, the polyvinyl alcohol (m) content is 11-27 wt % and the acetal (p) content is 65-88 wt % and the acetal has the following structure:

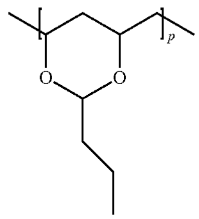

Solvent

The bonding agent of the invention comprises a solvent or solvent mixture that is capable of solvating the phenolic resol resin and the polyvinylbutyral, while being sufficiently volatile to be removed at atmospheric pressure. For example, suitable solvents and solvent mixtures are those having a vapour pressure of at least 5 hPA, more preferably at least 10 hPA, particularly preferably at least 20 hPa at 20° C.

Examples of suitable solvent mixtures are mixtures of ketones having $C_{1-6}$ alkyl groups, for example methyl-isobutyl ketone, methylethyl ketone, with $C_{1-5}$ aliphatic alcohols, and benzene and/or mono- and/or di-$C_{1-3}$-alkyl benzenes.

Preferably the solvent mixture comprises 2-10 wt % ketones having $C_{1-6}$ alkyl groups (for example methyl-isobutyl ketone, methylethyl ketone) mixed with 50-90 wt % $C_{1-5}$ aliphatic alcohols, and 5-20 wt % mono- and/or di-$C_{1-3}$-alkyl benzenes. These weight percentages are based on the total weight of the solvent mixture.

For example, a suitable solvent mixture comprises methyl isobutyl ketone, an alkyl benzene selected from xylenes, toluene and ethyl benzene, and a $C_{1-4}$ aliphatic alcohol.

More preferred is a mixture of methyl isobutyl ketone, xylene and iso-propanol. Particularly preferably the solvent mixture comprises 2-10 wt % methyl isobutyl ketone, 5-20 wt % xylene and 50-90 wt % iso-propanol, based on the total weight of the solvent mixture.

A particularly preferred solvent mixture is 5.9 wt % methyl isobutyl ketone, 13.61 wt % xylene, and 80.47 wt % iso-propanol, based on the total weight of the solvent mixture.

Other Ingredients

The bonding agents of the invention may additionally comprise other ingredients, such as, for example:

Dyes so the area of application can be discerned. The intensity of the dye gives an indication of the film thickness.

NOVOLAC resin can improve film formation. If used, NOVOLAC resin is preferably present at 1-15 wt %, more preferably at 2-5 wt %, based on the total weight of the bonding agent.

Method of Manufacture

The adhesive compositions of the invention are made by mixing the ingredients until the ingredients are dissolved.

Method of Use

The adhesive compositions of the invention are particularly suited for adhering castable polyurethanes and polyamides to each other, but particularly to metal, such as aluminium and/or steel.

The invention provides a method for adhering a first substrate that is substantially made of material selected from polyurethane, polyester, polyamide and metal to a second substrate that is substantially made of material selected from polyurethane, polyester, polyamide and metal, the method comprising the steps:

(1) providing the first substrate;

(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, while being sufficiently volatile to be removed at atmospheric pressure;

(3) optionally removing the solvent or solvent mixture by evaporation;

(4) placing the bonding agent layer in contact with a second substrate that is made of material selected from polyurethane, polyester, polyamide and metal, to form an assembly;

(5) heating the assembly to 90-200° C. for a time sufficient to form an adhesive bond between the first and second substrates.

The following pairs of substrates are particularly preferred:

| Substrate 1 | Substrate 2 |
|---|---|
| Metal | Castable polyurethane |
| Aluminium | Castable polyurethane |
| Steel | Castable polyurethane |
| Metal | Polyamide |
| Aluminium | Polyamide |
| Steel | Polyamide |
| Metal | Polyamide 66 |
| Aluminium | Polyamide 66 |

-continued

| Substrate 1 | Substrate 2 |
|---|---|
| Steel | Polyamide 66 |
| Castable polyurethane | Castable polyurethane |
| Castable polyurethane | Polyamide |
| Polyamide | Polyamide |

Metal substrates may be treated before applying the bonding agent of the invention. For example, metal surfaces may be cleaned using an aqueous detergent solution and/or an organic solvent in order to remove dirt and/or oil and/or grease. Metal surfaces may also be grit blasted.

Castable polyurethanes are usually formulated immediately prior to use and remain in flowable form for a limited time. The flowable polyurethane may be applied to the other substrate by pouring or other means.

Polyamides are usually in solid form, having been formed by injection moulding, blow-moulding or extrusion. Alternatively, the polyamide may be applied to the bonding agent-coated substrate in molten form, in particular by injection moulding.

The bonding agent is applied to one or both substrates. Often one substrate (for example a metal) is rigid, and the second substrate is fluid at the time of forming the adhesive bond, for example a molten plastic (e.g. molten polyester or polyamide) or a plastic that is sufficiently uncured to be in the fluid state (e.g. castable polyurethane). In such cases the bonding agent is applied to the rigid substrate, and the fluid plastic is applied to the bonding agent.

In one embodiment, the bonding agent is applied to a metal substrate, and a castable polyurethane is applied thereto.

In a second embodiment, the bonding agent is applied to a metal substrate, the substrate is placed in a mould, and polyamide is injected over the bonding agent coated surface.

In a third embodiment, the bonding agent is applied to a metal substrate, the substrate is placed in a mould, and polyester is injected over the bonding agent coated surface.

The bonding agent is typically applied to a thickness of 20-120 microns, more preferably between 20-80 microns or 20-60 microns. The optimum thickness will depend on surface roughness. At thicknesses below 20 microns adhesion is often compromised. At thicknesses above 120 microns adhesive failure may be observed under impact or excessive load.

The bonding agent can be applied, for example, by spraying, brushing, application with a cloth, dipping, printing processes, including with a stencil. In a preferred embodiment, the bonding agent is applied to a metal substrate, preferably by spraying and brushing.

After application, the solvent or solvent mixture may be evaporated by simply allowing the substrate to sit under ambient conditions. If desired, evaporation can be hastened by blowing air across the surface, and/or exposing the substrate to a vacuum.

In some situations, the bonding agent of the invention may be applied to a substrate, the solvent evaporated and the substrate coated with the bonding agent may be stored for later use, or transferred to another assembler, who may subsequently use it for bonding to a second substrate. Ideally, the bonding to a second substrate is carried out within 6 to 8 weeks of application of the bonding agent.

Curing of the bonding agent is carried out by heating from 90-200° C. Heating may occur, for example, in an oven, by IR, convection or radiative heating. The curing temperature must not exceed the melting temperature of the substrates. A preferred temperature for polyurethane is 90-130° C., more preferably 90-110° C. For polyamide the preferred temperature range is 100-160° C.

In cases where the molten polymer, e.g. polyamide, is applied directly to the bonding agent, it is not necessary to carry out an additional cure, the heat of the molten polymer being sufficient to cure the bonding agent.

The curing time will depend on the substrate and bonding conditions. For example, when castable polyurethane is bonded, the curing time is typically 12-20 hours, more 16 hours. When polyamide is bonded, the curing time is typically 16-72 hours, more preferably 24-72 hours. When polyester is bonded, the curing time is typically 16-72 hours, more preferably 24-72 hours.

In cases when the polymer, e.g. polyamide, is applied directly to the bonding agent, curing occurs within a few minutes, for example, 5-10 minutes.

In a preferred embodiment, solid polyamide is bonded, particularly to metal, and curing is carried out at 100-160° C. for 24 to 72 hours.

In another preferred embodiment, castable polyurethane is bonded, particularly to metal, and curing is carried out at 90-110° C. for 12-24 hours, more preferably 16 hours.

In another preferred embodiment, molten polyamide is applied to the substrate coated with bonding agent, particularly a metal substrate, and curing is effected by the heat of the molten polyamide.

Particularly Preferred Embodiments

The following are particularly preferred embodiments of the adhesive compositions of the invention:

1. A method for adhering a first substrate that is made of castable polyurethane to a second substrate that is made of metal, the method comprising the steps:

(1) providing an assembly that comprises a first substrate that is substantially made of castable polyurethane and a second substrate that is substantially made of metal, wherein the first substrate and the second substrate have sandwiched between them a layer of bonding agent comprising a (i) phenolic resol resin, (ii) polyvinylbutyral and a solvent or solvent mixture that is capable of solvating ingredients (i) and (ii), while being sufficiently volatile to be removed at atmospheric pressure; and (2) heating the assembly to 90-200° C. for a time sufficient to form an adhesive bond between the first and second substrates.

2. The method according to embodiment 1, wherein the heating in step (2) is carried out for 12-24 hours, particularly 16 hours.

3. A method for adhering a first substrate that is made of polyamide to a second substrate that is made of metal, the method comprising the steps:

(1) providing an assembly that comprises a first substrate that is substantially made of polyamide and a second substrate that is substantially made of metal, wherein the first substrate and the second substrate have sandwiched between them a layer of bonding agent comprising a (i) phenolic resol resin, (ii) polyvinylbutyral and a solvent or solvent mixture that is capable of solvating ingredients (i) and (ii), while being sufficiently volatile to be removed at atmospheric pressure; and (2) heating the assembly to 90-200° C. for a time sufficient to form an adhesive bond between the first and second substrates.

4. The method according to embodiment 3, wherein the heating in step (2) is carried out for 24-72 hours.

5. A method for adhering a first substrate that is substantially made of metal to a second substrate that is substantially made of castable polyurethane, the method comprising the steps:

(1) providing the first substrate;

(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, while being sufficiently volatile to be removed at atmospheric;

(3) optionally removing the solvent or solvent mixture by evaporation;

(4) placing the bonding agent layer in contact with a second substrate that is made of castable polyurethane, to form an assembly;

(5) heating the assembly to 90-200° C. for a time sufficient to form an adhesive bond between the first and second substrates.

6. The method of claim 5, wherein the heating in step (5) is carried out for 12-24 hours, particularly 16 hours.

7. A method for adhering a first substrate that is substantially made of metal to a second substrate that is substantially made of polyamide, the method comprising the steps:

(1) providing the first substrate;

(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, while being sufficiently volatile to be removed at atmospheric pressure;

(3) optionally removing the solvent or solvent mixture by evaporation;

(4) placing the bonding agent layer in contact with a second substrate that is made of polyamide, to form an assembly;

(5) heating the assembly to 90-200° C. for a time sufficient to form an adhesive bond between the first and second substrates.

8. The method of claim 7, wherein the heating in step (5) is carried out for 24-72 hours.

9. A method for adhering a first substrate that is substantially made of material selected from metal to a second substrate that is substantially made of material selected from polyamide, the method comprising the steps:

(1) providing the first metal substrate;

(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, while being sufficiently volatile to be removed at atmospheric pressure;

(3) optionally removing the solvent or solvent mixture by evaporation;

(4) applying molten polyamide to the bonding agent, such that the heat of the molten polyamide cures the bonding agent.

10. The method according to embodiment 9, wherein the solvent or solvent mixture has a vapour pressure of at least 5 hPA, more preferably at least 10 hPA, particularly preferably at least 20 hPa at 20° C.

11. The method according to embodiments 9 and/or 10, wherein the polyamide is applied by injection moulding.

12. A metal substrate coated with a bonding agent, where in the bonding agent comprises:

(1) a phenolic resol resin;

(2) polyvinylbutyral;

(3) a solvent or solvent mixture that is capable of solvating ingredients (1) and (2), while being sufficiently volatile to be removed at atmospheric pressure.

13. A method for adhering a first substrate that is substantially made of material selected from polyurethane, polyester, polyamide and metal to a second substrate that is substantially made of material selected from polyurethane, polyester, polyamide and metal, the method comprising the steps:

(1) providing a first substrate that is metal coated on a surface with a bonding agent comprising a (i) phenolic resol resin, (ii) polyvinylbutyral, a solvent or solvent mixture that is capable of solvating ingredients (i) and (ii), while being sufficiently volatile to be removed at atmospheric pressure;

(2) placing the coated surface of the first substrate in contact with a second substrate that is selected from castable polyurethane and polyamide;

(3) heating the assembly to 90-200° C. for a time sufficient to form an adhesive bond between the first and second substrates.

14. A bonding agent comprising:

(1) a phenolic resol resin;

(2) polyvinylbutyral;

(3) a solvent or solvent mixture that is capable of solvating ingredients (1) and (2), having a vapour pressure of at least 5 hPA, more preferably at least 10 hPA, particularly preferably at least 20 hPa at 20° C.

15. A method for adhering a first substrate that is made of material selected from polyurethane, polyester polyamide and metal to a second substrate that is made of material selected from polyurethane, polyester, polyamide and metal, the method comprising the steps:

(1) providing an assembly that comprises a first substrate that is substantially made of material selected from polyurethane, polyester, polyamide and metal and a second substrate that is substantially made of material selected from polyurethane, polyester, polyamide and metal, wherein the first substrate and the second substrate have sandwiched between them a layer of bonding agent comprising a (i) phenolic resol resin, (ii) polyvinylbutyral and a solvent or solvent mixture that is capable of solvating ingredients (i) and (ii), having a vapour pressure of at least 5 hPA, more preferably at least 10 hPA, particularly preferably at least 20 hPa at 20° C.; and (2) heating the assembly to 90-200° C. for a time sufficient to form an adhesive bond between the first and second substrates, wherein the first and second substrates are not both metal.

16. A method for adhering a first substrate that is substantially made of material selected from polyurethane, polyester, polyamide and metal to a second substrate that is substantially made of material selected from polyurethane, polyester, polyamide and metal, the method comprising the steps:

(1) providing the first substrate;

(2) applying a layer of a bonding agent to a surface of the first substrate, the bonding agent comprising a phenolic resol resin, polyvinylbutyral and a solvent or solvent mixture that is capable of solvating the phenolic resol resin and the polyvinylbutyral, having a vapour pressure of at least 5 hPA, more preferably at least 10 hPA, particularly preferably at least 20 hPa at 20° C.;

(3) optionally removing the solvent or solvent mixture by evaporation;

(4) placing the bonding agent layer in contact with a second substrate that is made of material selected from polyurethane, polyester, polyamide and metal, to form an assembly;

(5) heating the assembly to 90-200° C. for a time sufficient to form an adhesive bond between the first and second substrates, wherein the first and second substrates are not both metal.

17. A metal substrate coated with a bonding agent, where in the bonding agent comprises:

(1) a phenolic resol resin;

(2) polyvinylbutyral;

(3) a solvent or solvent mixture that is capable of solvating ingredients (1) and (2), having a vapour pressure of at least 5 hPA, more preferably at least 10 hPA, particularly preferably at least 20 hPa at 20° C.

18. The metal substrate according to embodiment 14, wherein the bonding agent has a thickness of 20-120 microns, more preferably between 20-80 microns or 20-60 microns.

19. A method for adhering a first substrate that is substantially made of metal to a second substrate that is substantially made of material selected from polyurethane, polyester, polyamide and metal, the method comprising the steps:

(1) providing a first substrate that is metal coated on a surface with a bonding agent comprising a (i) phenolic resol resin, (ii) polyvinylbutyral, a solvent or solvent mixture that is capable of solvating ingredients (i) and (ii), having a vapour pressure of at least 5 hPA, more preferably at least 10 hPA, particularly preferably at least 20 hPa at 20° C.;

(2) placing the coated surface of the first substrate in contact with a second substrate that is selected from castable polyurethane and polyamide;

(3) heating the assembly to 90-200° C. for a time sufficient to form an adhesive bond between the first and second substrates.

20. Any of the preceding embodiments, wherein the phenolic resol resin has the following characteristics:

Viscosity at 20° C., according to DIN EN ISO 12058-1, of 4000±500 mPa·s;

Non-volatile components at 135° C., according to DIN 16916-02-H1, ISO 8618 of 79±2%;

Content of free formaldehyde, according to DIN 16916-02, DIN EN ISO 11402 of maximum 5%;

Specific gravity at 20° C. of 1.26 g/cm$^3$.

21. Any of the preceding embodiments, wherein the bonding agent contains phenolic resol resin at 5 to 20 wt %, more preferably at 7 to 15 wt %, more particularly preferably 8 to 13 wt %, even more particularly preferably at 11-12 wt %, based on the total weight of the bonding agent.

22. Any of the preceding embodiments, wherein the the PVB has the following structure:

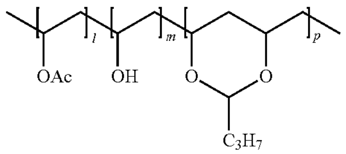

where the polyvinyl acetate (l) content is 1-8 wt %, the polyvinyl alcohol (m) content is 11-27 wt % and the acetal (p) content is 65-88 wt %, based on the total weight of the PVB.

23. Embodiment 22, wherein the acetal has the following structure:

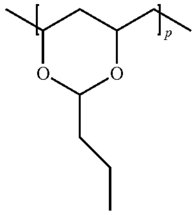

24. Any of the preceding embodiments wherein in the PVB the content of polyvinyl alcohol is 11-16 wt %, based on the total weight of the PVB.

25. Any of the preceding embodiments, wherein in the PVB the polyvinyl acetate content is 1-6 wt %, based on the total weight of the PVB.

26. Any of the preceding embodiments, wherein in the PVB the acetal content is 82-88 wt %. In a particularly preferred embodiment, the polyvinyl alcohol is 11-16 wt %, the polyvinyl acetate content is 1-6 wt %, and the acetal content is 82-88 wt %. These weight percentages are based on the total weight of the PVB.

27. Any of the preceding embodiments, wherein the PVB has a non-volatile content (determined according to DIN 53216) of greater than or equal to 97.5 wt %, a polyvinyl alcohol content of 12-16 wt % and a polyvinyl acetate content of 1-4 wt %, an acetal content of 82-88 wt %, a dynamic viscosity as determined according to DIN 53015 in a 10% ethanol solution at 20° C. of 120-280, a glass transition temperature, determined by DSC, according to ISO 11357-1, of 65° C., a water up-take after 24 hours water immersion at 20° C. of 3-5 wt %, and a bulk density, determined according to DIN EN 543, of 210 g/l, wherein the weight percentages are based on the total weight of the PVB.

28. Any of the preceding embodiments, wherein the bonding agent contains PVB at 5 to 15 wt %, more preferably 8 to 12 wt %, more particularly preferably at 10-11 wt %, based on the total weight of the bonding agent.

29. Any of the preceding embodiments, wherein the solvent is a mixture of ketones having $C_{1-6}$ alkyl groups, for example methyl-iso-butyl ketone, methylethyl ketone, with $C_{1-5}$ aliphatic alcohols, and mono- and/or di-$C_{1-3}$-alkyl benzenes.

30. Any of the preceding embodiments, wherein the solvent mixture comprises 2-10 wt % ketones having $C_{1-6}$ alkyl groups (for example methyl-iso-butyl ketone, methylethyl ketone) mixed with 50-90 wt % $C_{1-5}$ aliphatic alcohols, and 5-20 wt % mono- and/or di-$C_{1-3}$-alkyl benzenes, wherein the weight percentages are based on the total weight of the solvent mixture.

31. Any of the preceding embodiments, wherein the solvent mixture comprises methyl isobutyl ketone, an alkyl benzene selected from xylenes, toluene and ethyl benzene, and a $C_{1-4}$ aliphatic alcohol.
32. Any of the preceding embodiments, wherein the solvent mixture is a mixture of methyl isobutyl ketone, xylene and iso-propanol.
33. Any of the preceding embodiments, wherein the solvent mixture comprises 2-10 wt % methyl isobutyl ketone, 5-20 wt % xylene and 50-90 wt % iso-propanol, based on the total weight of the solvent mixture.
34. Any of the preceding embodiments, wherein the solvent mixture is 5.9 wt % methyl isobutyl ketone, 13.61 wt % xylene, and 80.47 wt % iso-propanol, based on the total weight of the solvent mixture.
35. Any of the preceding embodiments, wherein the metal substrates is treated before applying the bonding agent of the invention, by cleaning using an aqueous detergent solution and/or an organic solvent in order to remove dirt and/or oil and/or grease, and/or the metal surfaces is grit blasted.
36. Any of the preceding embodiments, Castable polyurethanes are usually formulated immediately prior to use and remain in flowable form for a limited time. The flowable polyurethane may be applied to the other substrate by pouring or other means.
37. Any of the preceding embodiments, wherein after application, the solvent or solvent mixture is evaporated by allowing the substrate to sit under ambient conditions, and/or by blowing air across the surface, and/or by exposing the substrate to a vacuum.
38. Any of the preceding embodiments, wherein the bonding agent is applied to a substrate, the solvent is evaporated and the substrate coated with the bonding agent is stored for later use.
39. Any of the preceding embodiments, wherein curing is carried out by heating from 90-200° C., preferably 110-130° C.
40. Any of the preceding embodiments, wherein the bonding agent additionally comprises NOVOLAC resin.
41. Any of the preceding embodiments, wherein the bonding agent additionally comprises NOVOLAC resin at 1-15 wt %, 2-15 wt %, or 2-5 wt % based on the total weight of the bonding agent.

EXAMPLES

TABLE 1

| Ingredients | |
|---|---|
| Trademark or abbreviation | Chemistry |
| Bakelite | Phenolic resol resin solution |
| MOWITAL | Polyvinylbutyral (PVB) |
| Ethacure 300 | dimethylthiotoluenediamine (DMTDA) |
| Adiprene LF 950 A | Toluene diisocyanate (TDI)-terminated polyether prepolymer |
| Thixon 409 | Commercially available bonding agent used for bonding cast polyurethanes to metal, consisting of: propylene glycol methyl ether acetate (27.63 wt %), toluene (8.23 wt %), MEK (38.17 wt %), phenoxy resin PKHH (22.36 wt %), water (2.24 wt %), Silquest A-187 (1.37 wt %) |

TABLE 1-continued

| Ingredients | |
|---|---|
| Trademark or abbreviation | Chemistry |
| Thixon 422 | Commercially available bonding agent used for bonding cast polyurethanes to metal, consisting of: Ethanol (20-30 wt %), xylene (25-30 wt %), MEK (10-20 wt %), butan-1-ol (3-10 wt %), ethylbenzene (2.5-10 wt %), formaldehyde oligomeric reaction products with phenol (1-10 wt %), ethyl acetate (1-10 wt %), methanol (1-3 wt %), glycidoxypropyltrimethoxy silane (1-3 wt %), phenol (0.25-1 wt %), toluene (0.1-0.25 wt %) |
| MEK | Methylethyl ketone |
| MiBK | Methyl-iso-butyl ketone |
| Silquest A-187 | Beta-(3,4-epoxycyclohexyl)ethyltrimethoxy silane Glycidoxypropyltrimethoxy silane |
| Ceresrot | Red dye |

Polyvinylbutyral

The polyvinylbutyral that was used had a non-volatile content (determined according to DIN 53216) of greater than or equal to 97.5 wt %. It had the structure:

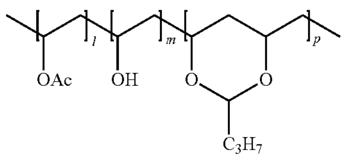

where the polyvinyl alcohol (m) content of 12-16 wt % and a polyvinyl acetate (l) content of 1-4 wt %, and the acetal has the following structure:

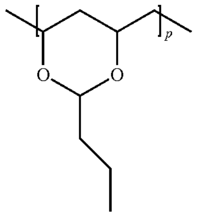

It had a dynamic viscosity as determined according to DIN 53015 in a 10% ethanol solution at 20° C. of 120-280. It had a glass transition temperature, determined by DSC, according to ISO 11357-1, of 65° C., a water up-take after 24 hours water immersion at 20° C. of 3-5 wt %, and a bulk density, determined according to DIN EN 543, of 210 g/l.

Bonding Agent

The ingredients listed in Table 2 were mixed together and stirred for 2 hours until all the ingredients were dissolved. A dye (ceresrot) was used for visual differentiation of coated and non-coated parts. Two bonding agents conventionally used for bonding cast polyurethane and metal (Thixon 409 and Thixon 422) were used for comparative purposes.

TABLE 2

Compositions of Example 1 and Comparative Examples Thixon 409 and Thixon 422

| Ingredient | Example 1 Wt % | THIXON 409 Wt % | THIXON 422 Wt % |
|---|---|---|---|
| Phenolic resol resin solution | 11.66 | 22.36 | 1-10 |
| Polyvinyl butyral (PVB) | 10.49 | — | — |
| Methyl isobutyl ketone | 4.6 | — | — |
| Methylethyl ketone (MEK) | — | 38.17 | 10-20 |
| Xylene | 10.59 | — | 25-30 |
| Toluene | — | 8.23 | 0.1-0.25 |
| Ethyl benzene | — | — | 2.5-10 |
| Ethanol | — | — | 20-30 |
| Methanol | — | — | 1-3 |
| Isopropyl alcohol | 62.60 | — | — |
| Water | — | 2.24 | — |
| Butan-1-ol | — | — | 3-10 |
| Ethyl acetate | — | — | 1-10 |
| Propylene glycol methyl ether acetate | — | 27.63 | — |
| Beta-(3,4-epoxycyclohexyl)ethyltrimethoxy silane (SILQUEST A-187) | — | 1.37 | — |
| Glycidoxypropyltrimethoxy silane | — | — | 1-3 |
| Ceresrot | 0.067 | — | — |

Substrates

Bonding performance was evaluated as follows:

Samples of the bonded parts used to perform the peel test were prepared as follows: steel strips (DIN ISO 813) 25 mm±0.5 mm in width, and 60 mm±1 mm in length; bonded area of 25 mm by 25 mm were cleaned and grit blasted. The bonding agent (Example 1) was applied by spraying on the metal surface to give an adhesive thickness of from about 20 μm to 30 μm. The bonding agent layer on the metal surface was dried at room temperature for 5 h. Then, coated steel parts were heated up in the oven for 10 min at 140° C. (prebake). Other coated parts were used directly after drying. All prepared coated steel stripes were heated for 30 min at 100° C. The heated coated steel strips were then bonded to a castable polyurethane elastomer at 100° C. for 16 h. For castable polyurethane elastomer preparation a toluene diisocyanate (TDI)-terminated polyether prepolymer (87.3 wt %, based on the total weight of the castable polyurethane) and dimethylthiotoluenediamine (12.6 wt %, based on the total weight of the castable polyurethane) were heated up separately in the oven for 30 min at 100° C. Both heated materials were mixed together for max. 60 sec and poured directly at 100° C. over the coated metal parts.

Test specimen were cooled to room temperature before pulling to destruction. Bonded parts using the bonding system of the present invention are pulled to destruction after curing according to the peel test procedure described in ASTM Test D429—Method B.

The bonding results of Example 1 and comparative Samples Thixon 409 and Thixon 422, in a standard peel test of cast polyurethane elastomer and metal bonding are shown in Table 3. Failure mode is reported as % R, meaning the percentage of failures that occur in the castable polyurethane or the polyimide.

A high peel strength of 447 N/cm was observed for Example 1 without additional prebaking and a film thickness of 35 μm. Additional preheating for 10 min at 140° C. of the coated metal parts resulted in a significant increase of bond strength up to 509 N/cm with a low film thickness of 23-29 μm. A rubber retention of up to 98% was observed.

In contrast, comparative Examples using Thixon 402 and Thixon 422 showed bond strengths of 326 and 329 N/cm, respectively, at much higher adhesive thickness (200 microns).

Further bonding of reinforced plastic to metal was tested with the bonding agent of Example 1.

Bonding agents for bonding of reinforced plastics to themselves and/or to metals were tested according to the lap shear test procedure described in ASTM Test D5868-01 (2014).

Samples of the bonded parts used to perform the peel test were prepared as follows: steel strips (DIN ISO 813) 25 mm±0.5 mm in width, and 60 mm±1 mm in length; bonded area of 25 mm by 30 mm were cleaned and grit blasted. The bonding agent (Example 1) was applied by spraying on the metal surface to yield a thickness of from about 20 μm to 30 μm. The bonding agent layer on the metal surface was dried at room temperature. Glass reinforced polyamide 66 (PA66) strips (25 mm±0.5 mm in width, and 60 mm±1 mm in length) were cleaned with alcohol and dried at room temperature. The coated steel part was pressed to the polyamide strip while applying pressure with an overlap of 25×30 mm. The test specimens were cured for 58 h at 120° C. The test specimens were cooled to room temperature before pulling to destruction. Specimens bonded using the bonding agent of the present invention were pulled to destruction after curing according to the peel test procedure described in ASTM Test D5868-01.

The lap shear bond strength for PA66 bonded to grit blasted steel with the bonding agent of Example 1 was 8.6 N/mm$^2$. The lap shear bond strength for PA66 bonded to grit blasted aluminium with the bonding agent of Example 1 was 6.1 N/mm$^2$.

TABLE 3

Peel strength and fracture pattern for a bonding agent of the invention (Example 1) and conventional bonding agents (Thixon 409 and Thixon 422)

| Adhesive | Film thickness (micron) | Prebake | Peel strength (N/cm) | Fracture pattern (% R) |
|---|---|---|---|---|
| Example 1 | 29 | 0 | 326 | 85 |
| Example 1 | 23 | 10 min, 140° C. | 509 | 93 |
| Example 1 | 35 | 0 | 447 | 95 |
| Example 1 | 29 | 10 min, 140° C. | 464 | 98 |
| Thixon 409 | 200 | 0 | 326 | 100 |
| Thixon 422 | 110 | 0 | 329 | 100 |

The invention claimed is:

1. A bonding agent for bonding castable polyurethane and/or polyamides comprising:

(1) a phenolic resol resin having the following characteristics:

viscosity at 20° C. of 4000±500 mPa·s;

non-volatile components at 135° C. of 79±2%; content of free formaldehyde of maximum 5%; and specific gravity at 20° C. of 1.26 g/cm$^3$;

(2) polyvinylbutyral (PVB); and (3) a solvent or solvent mixture that is capable of solvating ingredients (1) and (2), while being sufficiently volatile to be removed at atmospheric pressure.

2. The bonding agent according to claim 1, wherein the solvent or solvent mixture has a vapor pressure of at least 5 hPa at 20° C.

3. The bonding agent of claim 1 wherein the phenolic resol resin is present at 5 to 20 wt %, based on a total weight of the bonding agent.

4. The bonding agent of claim 1 wherein the phenolic resol resin is present at 7 to 15 wt %, based on a total weight of the bonding agent.

5. The bonding agent of claim 4 wherein the phenolic resol resin is present at 11-12 wt %, based on a total weight of the bonding agent.

6. The bonding agent of claim 1 wherein the PVB has the following structure:

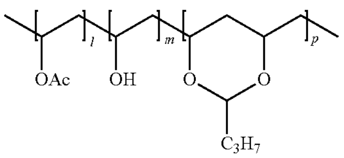

where the polyvinyl acetate (l) content is 1-8 wt %, the polyvinyl alcohol (m) content is 11-27 wt % and the acetal (p) content is 65-88 wt %, based on a total weight of the PVB.

7. The bonding agent of claim 6, wherein the acetal (p) has the following structure:

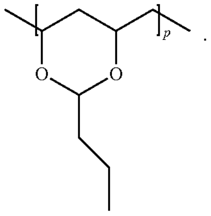

8. The bonding agent of claim 6 wherein the PVB has a polyvinyl alcohol (m) content of 12-16 wt % and a polyvinyl acetate (l) content of 1-4 wt %, wherein the weight percentages are based on a total weight of the PVB.

9. The bonding agent of claim 1 wherein the PVB has a content of polyvinyl alcohol of 11-16 wt %, a polyvinyl acetate content of 1-6 wt %, and an acetal content of 82-88 wt %, wherein the weight percentages are based on a total weight of the PVB.

10. The bonding agent of claim 1 wherein the polyvinylbutyral has a non-volatile content of greater than or equal to 97.5 wt %, a polyvinyl alcohol content of 12-16 wt % and a polyvinyl acetate content of 1-4 wt %, an acetal content of 82-88 wt %, a dynamic viscosity in a 10% ethanol solution at 20° C. of 120-280, a glass transition temperature, determined by DSC, of 65° C., a water up-take after 24 hours water immersion at 20° C. of 3-5 wt %, and a bulk density of 210 g/L, wherein the weight percentages are based on a total weight of the PVB.

11. The bonding agent of claim 1 wherein the solvent is a mixture of ketones having $C_{1-6}$ alkyl groups, with $C_{1-5}$ aliphatic alcohols, and mono- and/or di-$C_{1-3}$-alkyl benzenes.

12. The bonding agent of claim 1 wherein the solvent mixture comprises 2-10 wt % ketones having $C_{1-6}$ alkyl groups, mixed with 50-90 wt % $C_{1-5}$ aliphatic alcohols, and 5-20 wt % mono- and/or di-$C_{1-3}$-alkyl benzenes, wherein the weight percentages are based on a total weight of the solvent mixture.

13. The bonding agent of claim 1 wherein the solvent mixture comprises methyl isobutyl ketone, an alkyl benzene selected from the group consisting of xylenes, toluene and ethyl benzene, and a $C_{1-4}$ aliphatic alcohol.

14. The bonding agent of claim 1 wherein the solvent mixture is a mixture of methyl isobutyl ketone, xylene and iso-propanol.

15. The bonding agent of claim 1 wherein the solvent mixture comprises 2-10 wt % methyl isobutyl ketone, 5-20 wt % xylene and 50-90 wt % iso-propanol, based on the total weight of a solvent mixture.

16. The bonding agent of claim 1 wherein the solvent mixture is 5.9 wt % methyl isobutyl ketone, 13.61 wt % xylene, and 80.47 wt % iso-propanol, based on a total weight of the solvent mixture.

* * * * *